Figure 1:
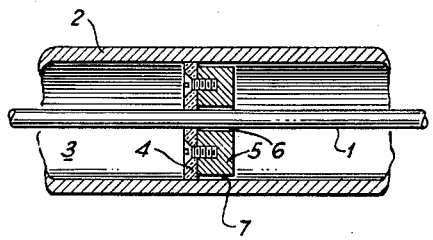

Feb. 27, 1951     J. COLLARD ET AL     2,543,721
HIGH-FREQUENCY ELECTRICAL TRANSMISSION
LINE AND WAVE GUIDE
Original Filed Feb. 9, 1944      2 Sheets-Sheet 1

INVENTORS
JOHN COLLARD &
HERBERT EDWARD HOLMAN
BY
ATTORNEY

Feb. 27, 1951   J. COLLARD ET AL   2,543,721
HIGH-FREQUENCY ELECTRICAL TRANSMISSION
LINE AND WAVE GUIDE
Original Filed Feb. 9, 1944   2 Sheets-Sheet 2

INVENTORS
JOHN COLLARD &
HERBERT EDWARD HOLMAN
BY
ATTORNEY

Patented Feb. 27, 1951

2,543,721

UNITED STATES PATENT OFFICE 2,543,721

HIGH-FREQUENCY ELECTRICAL TRANSMISSION LINE AND WAVE GUIDE

John Collard, London, and Herbert Edward Holman, West Drayton, England, assignors to Electric & Musical Industries Limited, Hayes, Middlesex, England, a company of Great Britain Original application February 9, 1944, Serial No. 521,727. Divided and this application June 22, 1948, Serial No. 34,376. In Great Britain and Australia January 23, 1942

Section 1, Public Law 690, August 8, 1946
Patent expires January 23, 1962

6 Claims. (Cl. 178—44)

The present invention relates to apparatus such as high frequency electrical transmission lines and wave guides having movable short-circuit or closing devices positioned within them. This application is a division of our co-pending application Serial No. 521,727, filed February 9, 1944, now abandoned.

It is known that the impedance of a high frequency electrical transmission line which is not terminated to avoid reflection is dependent upon its length. Thus, if it is required to vary the impedance of the line, it is convenient to provide a short-circuit for the line the position of which can be varied to give the desired variation in the line impedance. Closing devices similar to the aforesaid short-circuiting devices may also be provided the the ends of wave guides. Short-circuiting or closing devices as hitherto provided have comprised a conducting member in the form of a piston, plug or disc which is inserted in the outer shell of the line or guide in contact therewith and with the other conductor thereof if such conductor is provided. The contact obtainable with a simple piston or other device is variable and gives rise to variable impedance effects, and accordingly it has been proposed to provide clamping devices for clamping the outer shell and the piston together. The provision of such clamping devices complicates the mounting of the short-circuiting or closing device, particularly in situations where the device is mounted in an inaccessible position, for example, behind a panel from the front of which the position of the short-circuit or closure is required to be adjusted, as means must be provided to enable the clamp to be released for adjustment purposes. Short-circuiting or closing devices as hitherto proposed, have also been subject to the drawback that when they are adjusted undesirable noise effects may be produced in the circuit including the transmission line. In a concentric conductor line it is also desirable in some cases to provide a short-circuit for high frequencies which is not effective for low frequencies or direct current.

The object of the present invention is to provide a high frequency electrical transmission line or wave guide having a short-circuiting or closing device mounted in it which will function satisfactorily without the application of special clamping means to cause the device to make good contact with the line or guide and which can be adjusted in position without producing undesired noise effects.

The invention also permits the provision in a concentric conductor line of a short-circuit which is only available for high frequencies and does not provide a low frequency or direct current connection between the conductors.

In accordance with the present invention, a high frequency electrical transmission line or wave guide is provided comprising a conducting shell provided with a short-circuiting or closing device formed and arranged so as to present a path of low impedance for high frequencies which is predominantly capacitative.

In some forms of the invention said device may be constituted so as to reduce or prevent leakage of high frequency energy beyond said device.

In order to increase the capacity afforded at the short-circuit or closure, apparatus in accordance with the invention may comprise a further short-circuiting or closing device similar to the first but spaced therefrom at a distance of a half wavelength or any whole number of half wavelengths at the operating frequency.

Figure 3:
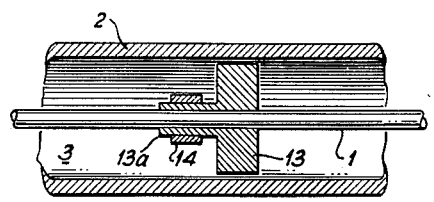
Figure 4:
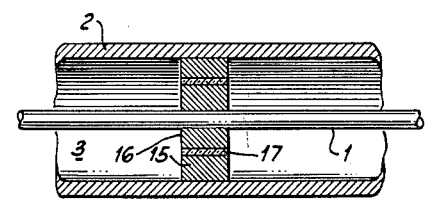
Figure 5:
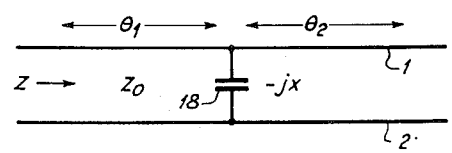

In order that the said invention may be clearly understood and readily carried into effect, the same will now be more fully described with reference to the accompanying drawing, in which:

Figures 1, 2, 3, 4, 6 and 7 show longitudinal sectional views of portions of high frequency transmission lines of the concentric conductor type embodying the invention, and Figure 5 represents the equivalent electrical circuit of a transmission line such as those represented in Figures 1 to 4, inclusive, and Figures 8, 9, 10 and 11 illustrate in longitudinal sectional view the application of the invention to wave guides.

In all the figures of the drawing reference numeral 1 represents the inner conductor of the transmission line, reference numeral 2 represents the outer conductor, and reference numeral 3 indicates a piston which constitutes the short-circuiting device.

In the constructional form of the invention shown in Figure 1 the piston 3 comprises an annular insulator 4, for example, having sliding engagement with the inner conductor 1 and the outer conductor 2 and carrying an annular conducting member 5 which is separated from the inner line conductor by an air gap 6 and from the outer line conductor by another air gap 7. In this form, the high frequency short-circuit is provided through the path including the capacity between the inner conductor 1 and the annular conducting member 5, the annular conducting member 5 and the capacity between the annular conductor member 5 and the outer conductor 2. The insulator 4 serves to maintain the conducting member 5 sufficiently spaced from the line conductors to prevent direct contact between the member and either conductor. An annular insulator 4 can, of course, be secured to each end of the annular conductor for better location of the annular conductor between the line conductors. Since the annular conducting member 5 has capacity to the inner and outer line conductors, it acts as a reactance connected across the conductors. The greater the capacity of the annular member to the line conductors, the lower the reactance and the lower the impedance of the piston. For this reason the capacity in the piston should usually be as large as possible. Thus, the clearance between the conducting member 5 and the line conductors in the piston should be as small as possible. However, the clearances are limited to a certain minimum value from mechanical considerations and from the fact that the gap between proximate conducting surfaces must be sufficient to provide adequate insulation. The capacity can be increased by lengthening the annular conducting member, but as the length of this must be kept small compared with a wavelength at the operating frequency, the length of the annular conductor is limited especially at very short wavelengths.

Figure 2:
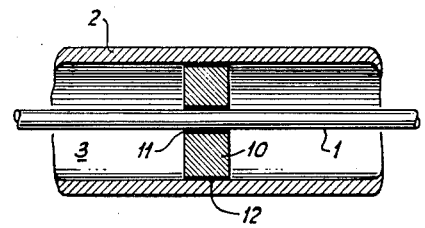

An arrangement for providing a high capacity in the short-circuit is indicated in Figure 2. In this case the piston 3 comprises an annular conducting member 10 of aluminum which is anodised on its outer and inner surfaces to provide insulating layers 11 and 12 between the line conductors. The anodised surfaces of the number 10 engage the line conductors. The anodised layers act as good insulators, and since they are extremely thin, very high capacities are produced across them. If desired, instead of providing anodised layers on the metal, the annular conducting member might be covered with a layer of vitreous enamel which can be ground to produce a good fit in the outer conductor and on the inner conductor.

It is not essential to insulate the annular conducting member from both inner and outer line conductors. In practice it is often convenient to make the annular conductor touch the inner conductor, but to insulate it from the outer conductor. For example, in the arrangement of Figure 3 the piston comprises an annular conducting member 13 which is provided with a springy extension 13a, which is split and pressed on to the inner conductor by means of spring clip 14. In this case the inner line conductor 1 must be firmly located on the axis of the outer conductor 2, so as to maintain the spacing between the inner conductor and the outer conductor and between the outer face of conducting member 12 and the outer conductor without the provision in the piston of a spacer such as 4 of Figure 1 between the line conductors.

In the arrangement of Figure 4 the piston comprises two coaxial annular conducting members 15 and 16, one arranged outside the other, and the inner member 15 being in contact with the inner line conductor 1 and the outer member 16 being in contact with the outer line conductor 2, the two members 15 and 16 being separated by a thin layer 17 of insulating material such as mica. In this case the effect of the indeterminate contact of the piston with the conductors is rendered insignificant by the impedance of the capacity between the two parts of the piston.

A further method of increasing the capacity of the short-circuit in a transmission line in accordance with the invention is to use two or more pistons rigidly fixed with respect to each other at a distance of half a wavelength or any whole number of half wavelengths apart at the operating frequency. In this case the capacities of the pistons are then effectively in parallel.

An alternative method of constructing a piston in a high frequency transmission line or wave guide in accordance with the invention is to make the piston entirely of insulating material having as high a dielectric constant as possible, thus producing an increased capacity at the point where the piston is placed. Conveniently, for example, the body of which the piston is formed could consist of comminuted electrically conducting material such as metallic powder mixed with a dielectric binder which provides insulation between metallic particles so that the body effectively constitutes an insulator. The method of making bodies formed of mixed metallic powders and insulating materials is well known from the practice in connection with the manufacture of transformers having cores of comminuted magnetic material suspended in a suitable binder.

Figure 5 shows the equivalent circuit of the line sections represented in Figures 1 to 4. In this Figures 1 and 2 represent the outer line conductors as in the preceding figures, while 18 represents the capacity provided by the short-circuiting piston. $\theta_1$ is the phase change occurring in a wave between one end of the line and the short-circuit and $\theta_2$ is the phase change in a wave passing between the other end of the line and the short-circuit. Since the length of the line is constant, the sum $\theta_1+\theta_2$ will be constant. The input impedance Z of the line as seen from the end shown on the left in Figure 5 will be $$Z=jZ_0\frac{X(t_1t_2-1)+Z_0t_1}{X(t_1+t_2)+Z_0}$$

Where $$t_1=\tan\theta_1$$

and $$t_2=\tan\theta_2$$

$Z_0$ is the characteristic impedance of the line and X is the reactance of the short-circuiting piston, Let $$K=\theta_1+\theta_2$$

and $$\tan K=t$$

then $$Z=jZ_0\frac{-X(t+t_1^2)+Z_0t_1(1+tt_1)}{X(1+t_1^2)+Z_0(1+tt_1)}$$

If the reactance X of the short-circuiting piston is zero, the expression Z reduces to $jZ_0\tan\theta_1$, that is to say, the value of the impedance Z can be adjusted by shifting the position of the piston over a range of values extending from + infinity to — infinity. If the aforesaid reactance is infinity, the expression for Z reduces to $$\frac{jZ_0}{t}$$

which is, as would be expected, constant whatever the position of the short-circuiting piston. Thus it will be appreciated that the lower the value of the short-circuiting impedance the larger will be the range of adjustment of the value of the impedance obtainable by changing the position of the short-circuiting piston. Thus, where a wide range of impedance is required, X must be small compared with $Z_0$. In any given case the range of impedance can be calculated from the expression given above, where $Z_0$ is the characteristic impedance of the line.

It will be appreciated that the piston in accordance with the invention, when mounted in a transmission line or wave guide, itself provides a section of transmission line along which there will be some leakage of energy past the short-circuiting piston, and in order to prevent this leakage the piston may be constructed so as to prevent or reduce leakage.

Figure 6:
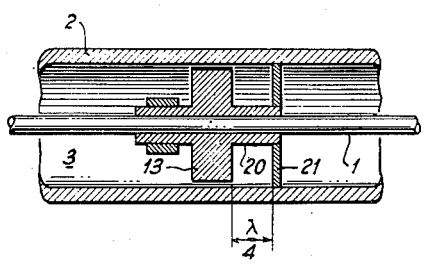
Figure 7:
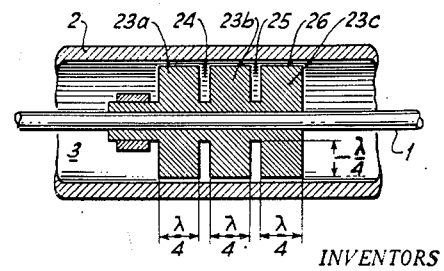

Thus, in Figure 6 the short-circuiting piston proper is generally of the form shown in Figure 3, but the annular conducting member 13 is formed with an extension 20 about the conductor 1, this extension being directed away from the source from which waves are transmitted along the line and carrying on its end a conducting disc 21 which provides a short circuit between the inner conductor 1 and the outer conductor 2. The distance between the facing surfaces of the member 13 and the disc 21 is made equal to a quarter of a wavelength so that the section of line following the member 13, being closed by the short-circuiting disc 21, presents a high impedance as seen from member 13. Thus any variation in the contact between the disc 21 and either of the conductors 1 or 2 will not give rise to any significant change in the impedance of the piston 13 as seen from the end of the line from which transmission takes place. The disc 21 does, however, serve effectively to prevent any leakage past the short-circuiting piston.

It will be seen that the arrangement of Figure 6 has the disadvantage that a D. C. connection is provided between the conductors 1 and 2 and in Figure 7 a further form of the invention is shown in which the leakage past the piston is effectively prevented, but in which no D. C. connection is provided between the conductors of the line. In the case of the arrangement shown in Figure 7, the piston comprises a portion generally similar to the piston shown in Figure 3, but the member 23 corresponding to the member 13 is extended and provided with annular grooves such as 24 and 25 which divide the member 23 into portions 23a, 23b and 23c. The length of each of the portions 23b and 23c is made equal to a quarter of a wavelength and the depth of the grooves 24 and 25 is also made equal to a quarter of a wavelength. With this arrangement it will be seen that the groove 25 and the portion 23c as seen from the periphery 26 of the portion 23b will appear as a short-circuited quarter wave line constituted by the surfaces of the groove 25 in series with an open-ended quarter wave line constituted by the outer surface of portion 23c and the adjacent surface of the outer conductor 2 of the line proper. As the short-circuited quarter wave line presents a high impedance while the open-ended quarter wave line presents a low impedance, it will be seen that any transmission beyond the periphery 26 of portion 23b to the right thereof will set up a high voltage across the grooves 25 and a low voltage between the member 23c and the conductor 2, and thus only a very small voltage is effective to cause leakage past the member 23c. Similarly, groove such as 24 and piston portions such as 23a serve to reduce the leakage voltage available at the portion 23b. In some cases sufficient reduction of the leakage voltage may be obtained without providing groove 25 and portion 23c on the piston, or if further reduction is required, the piston may be extended and more grooves provided. It will be appreciated that it is only possible to adopt an arrangement such as that shown in Figure 7 if the dimensions of the tube are large enough to permit the depth of the sections such as 24 and 25 to be made equal to a quarter of a wavelength, and it will be understood that if it is desired and practicable the depth of the groove and the length of a section such as 23b and 23c can be made equal to an odd multiple of a quarter of a wavelength.

In cases where a pair of similar devices are employed to afford additional short-circuiting capacity as above described, the outer device may be of the form shown in Figure 6 for preventing undesired leakage.

Figure 8:
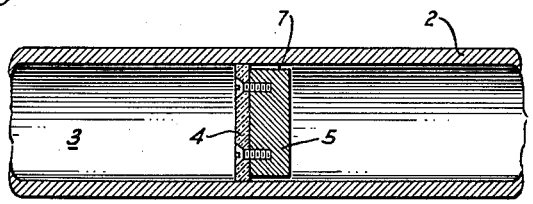
Figure 9:
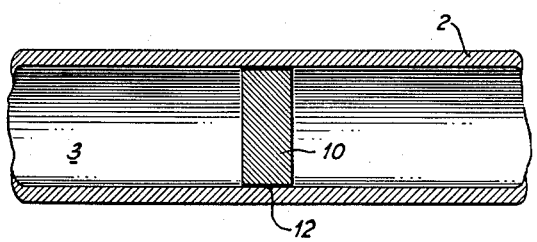
Figure 10:
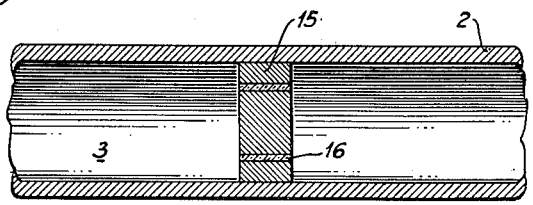
Figure 11:
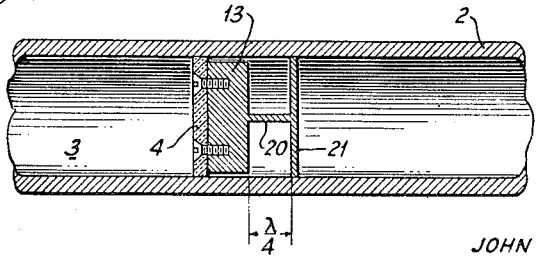

The invention may also be embodied in a wave guide having a conducting shell closed at one end by a closing device which is required to be capable of being adjusted in position. In such a guide, no central conductor will be available to support the closing device, so that it is preferred to employ a device which constitutes a plug for the guide and which is located by engagement with the guide and does not require additional support. For example, closing devices similar to the short-circuiting devices shown in Figures 1, 2, 4 and 6 may be employed. Examples are shown in Figures 8, 9 and 10. In each case, the central conducting member of the piston is solid and has no central hole to receive an inner conductor such as those shown in Figures 1, 2, 4 and 6. Similar parts are similarly numbered and, from the foregoing description, it is believed that the operation of these closing devices may be understood without additional description. The closing device for a wave guide may also be constituted by a body of comminuted conducting material suspended in a solid dielectric binder.

What is claimed is:

1. The combination including an electric wave guide and a plug therewithin having a conductive face and a conductive periphery closely spaced from and insulated from the wave guide wall, said plug having a radial conductively surfaced slot a quarter wavelength deep at the operating frequency and communicating with the space between said periphery and the said wave guide wall at a quarter wavelength at the operating frequency from said face, said slot having an axial dimension short compared to its depth, whereby the said plug short-circuits the wave guide for electromagnetic energy at the said operating frequency and is open-circuited from the wave guide wall for direct current.

2. The combination of an electric wave guide and a plug therewithin having a conductive face and a conductive periphery closely spaced from and insulated from the wave guide wall, said plug having a plurality of radial conductively surfaced slots a quarter wavelength deep at the operating frequency and the first said slot communicating with the space between the said periphery and the wave guide wall at a quarter wavelength at the operating frequency from said face, the said slots communicating with the space between said periphery and said wave guide wall at points a quarter wavelength distant from each other and each slot having an axial width short compared to its depth, whereby the said plug short-circuits the wave guide for electromagnetic energy at the said operating frequency and is open-circuited from the wave guide wall for direct current.

3. In an electric wave guide, a plug for insertion therewithin having a conductive face and a conductive periphery closely spaced from and insulated from the wave guide wall, said plug having a radial conductively surfaced narrow slot a quarter wavelength deep at the operating frequency and communicating with the space between said periphery and the said wave guide wall at a quarter wavelength at the operating frequency from said face whereby the said plug short-circuits the wave guide for electromagnetic energy at the said operating frequency and is open-circuited from the wave guide wall for direct current.

4. The combination claimed in claim 1, said tubular conductor having a circular internal cross-section.

5. The combination claimed in claim 1, said wave guide being a circular wave guide.

6. The combination claimed in claim 2, said wave guide being a circular wave guide.

JOHN COLLARD.
HERBERT EDWARD HOLMAN.

REFERENCES CITED

The following references are of record in the file of this patent:

UNITED STATES PATENTS

| Number | Name | Date |
|---|---|---|
| 2,226,479 | Pupp | Dec. 24, 1940 |
| 2,342,254 | Dallenbach | Feb. 22, 1944 |
| 2,351,895 | Allerding | June 20, 1944 |
| 2,400,777 | Okress | May 21, 1946 |
| 2,419,613 | Webber | Apr. 29, 1947 |
| 2,424,002 | Sloan | July 15, 1947 |
| 2,438,912 | Hansen | Apr. 6, 1948 |
| 2,438,913 | Hansen | Apr. 6, 1948 |
| 2,439,388 | Hansen | Apr. 13, 1948 |
| 2,451,876 | Salisbury | Oct. 19, 1948 |
| 2,479,687 | Linder | Aug. 23, 1949 |